US012561913B2

(12) United States Patent
Graziosi et al.

(10) Patent No.: US 12,561,913 B2
(45) Date of Patent: \*Feb. 24, 2026

(54) MESH ZIPPERING

(71) Applicants: SONY GROUP CORPORATION, Tokyo (JP); Sony Corporation of America, New York, NY (US)

(72) Inventors: Danillo Graziosi, Flagstaff, AZ (US); Alexandre Zaghetto, San Jose, CA (US); Ali Tabatabai, Cupertino, CA (US)

(73) Assignees: Sony Group Corporation, Tokyo (JP); Sony Corporation of America, New York, NY (US)

( \* ) Notice: Subject to any disclaimer, the term of this patent is extended or adjusted under 35 U.S.C. 154(b) by 224 days.

This patent is subject to a terminal disclaimer.

(21) Appl. No.: 17/987,847

(22) Filed: Nov. 15, 2022

(65) Prior Publication Data

US 2023/0306687 A1     Sep. 28, 2023

Related U.S. Application Data

(60) Provisional application No. 63/269,911, filed on Mar. 25, 2022.

(51) Int. Cl.
  *G06T 17/20*     (2006.01)
  *G06T 9/00*     (2006.01)
(52) U.S. Cl.
  CPC .............. *G06T 17/205* (2013.01); *G06T 9/00* (2013.01); *G06T 2210/36* (2013.01); *G06T 2210/56* (2013.01)
(58) Field of Classification Search
  CPC ..... G06T 17/205; G06T 9/00; G06T 2210/36; G06T 2210/56
  See application file for complete search history.

(56) References Cited

U.S. PATENT DOCUMENTS 5,988,862 A * 11/1999 Kacyra ................ G01C 15/002
                                                   702/155
11,297,346 B2     4/2022 Chou et al.
        (Continued)

FOREIGN PATENT DOCUMENTS

JP          2019125402 A      7/2019
WO    WO2000042575      *   7/2000   ............. G06T 17/20
        (Continued)

OTHER PUBLICATIONS

Danillo B Graziosi (Sony) et al: "[V-CG] Sony's Dynamic Mesh Coding Call for Proposal Response", 138. MPEG Meeting; Apr. 25, 2022-Apr. 29, 2022; Online; (Motion Picture Expert Group or ISO/IEC JTC1/SC29/WG11), No. m59284 Apr. 24, 2022 (Apr. 24, 2022), XP030301436, 30 pages.
        (Continued)

*Primary Examiner* — Phuc N Doan
(74) *Attorney, Agent, or Firm* — Haverstock & Owens, A Law Corporation

(57)          ABSTRACT

Ways to improve mesh reconstruction by modifying the position of vertices at the border of patches to make sure that neighboring patches do not have a gap between them, also known as zippering, are described herein. Six different methods to implement the post-processing operation, as well as syntax elements and semantics for transmission of the filter parameters, are disclosed. A hierarchical method indicate the geometry distortion that can generate gaps between patches. The value per frame, or per patch, or per boundary object is sent. The number of bits to encode the values is also dependent on the previous geometry distortion. A method sends index matches instead of geometry distortion. The matching index is sent per boundary vertex, but a method to send only one index of the pair is implemented as well.

15 Claims, 3 Drawing Sheets

(56) References Cited

U.S. PATENT DOCUMENTS

| | | | |
|---|---|---|---|
| 2013/0300734 A1* | 11/2013 | Schmidt | G06T 19/20 |
| | | | 345/419 |
| 2021/0090301 A1* | 3/2021 | Mammou | G06T 7/11 |
| 2021/0327119 A1 | 10/2021 | Malin et al. | |
| 2023/0063575 A1* | 3/2023 | Huang | G06T 9/20 |

FOREIGN PATENT DOCUMENTS

| | | |
|---|---|---|
| WO | WO-2017180315 A1 | 10/2017 |
| WO | 20210146041 A1 | 7/2021 |

OTHER PUBLICATIONS

Danillo Graziosi (Sony) et al: "[VPCC] [EE2.6-related] Mesh Geometry Smoothing Filter", 132.MPEG Meeting; Oct. 12, 2020-Oct. 16, 2020; Online; (Motion Picture Expert Group or ISO/IEC JTC1/SC29/WG11), No. m55374 Oct. 13, 2020 (Oct. 13, 2020), XP030291885, 6 pages.

The International Search Report and the Written Opinion dated May 19, 2023 for PCT Application No. PCT/IB2023/052107.

Danillo Graziosi et al., "Mesh Geometry Smoothing Filter", 132. MPEG Meeting; Oct. 12, 2021-Oct. 16, 2020; online; (Motion Picture Expert Group or ISO/IEC JTC1/SC29/WG11), No. m55374 Oct. 13, 2020 (Oct. 13, 2020), XP030291885, Retrieved from the Internet: URL:https://dms.mpeg.expert/doc_end_user/documents/132_Online/wb11/m55374-v1-m55374_mesh_geometry_smoothing.zipm55374_mesh_geometry_smoothing docx [retrieved on Oct. 13, 2020] paragraphs [03.1], [03.2].

Danillo Graziosi et al., "[V-CG] Sony's Dynamic Mesh Coding Call for Proposal Response", 138. MPEG Meeting; Apr. 25, 2022-Apr. 29, 2022; Online; (Motion Picture Expert Group or ISO/IEC JTC1/SC29/WG11), No. m59284 Apr. 24, 2022 (Apr. 24, 2022), XP030301436, Retrieved from the Internet; URL:https://dms.mpeg.expert/doc_end_user/documents/138_OnLine/wg11/m59284-v2-m59284_Sony_Dynamic_Mesh_CfP_Response.docx [retrieved on Apr. 24, 2022] paragraph [1.c.vi].

* cited by examiner

MESH ZIPPERING

CROSS-REFERENCE TO RELATED APPLICATION(S)

This application claims priority under 35 U.S.C. § 119(e) of the U.S. Provisional Patent Application Ser. No. 63/269, 911, filed Mar. 25, 2022 and titled, "MESH ZIPPERING," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is nomechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x, y, z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

Ways to improve mesh reconstruction by modifying the position of vertices at the border of patches to make sure that neighboring patches do not have a gap between them, also known as zippering, are described herein. Six different methods to implement the post-processing operation, as well as syntax elements and semantics for transmission of the filter parameters, are disclosed. A hierarchical method indicate the geometry distortion that can generate gaps between patches. The value per frame, or per patch, or per boundary object is sent. The number of bits to encode the values is also dependent on the previous geometry distortion. A method sends index matches instead of geometry distortion. The matching index is sent per boundary vertex, but a method to send only one index of the pair is implemented as well.

In one aspect, a method programmed in a non-transitory memory of a device comprises finding a plurality of border points, selecting a zippering implementation from a plurality of mesh zippering implementations and merging vertices based on the selected mesh zippering implementation. The plurality of mesh zippering implementations comprise: a fixed value per sequence implementation, a max distortion per sequence implementation, a max distortion per frame implementation, a max distortion per patch implementation, a per boundary point implementation and a matched patch/vertex index implementation. The fixed value per sequence implementation includes limiting a scope of a search for a matching border point based on distance. The per boundary point implementation includes receiving distortion information without performing a search. The matched patch/vertex index implementation includes matching indices. Selecting the zippering implementation from the plurality of mesh zippering implementations is programmed. Selecting the zippering implementation from the plurality of mesh zippering implementations is adaptively selected based on a set of detected criteria.

In another aspect, an apparatus comprises a non-transitory memory for storing an application, the application for: finding a plurality of border points, selecting a zippering implementation from a plurality of mesh zippering implementations and merging vertices based on the selected mesh zippering implementation and a processor coupled to the memory, the processor configured for processing the application. The plurality of mesh zippering implementations comprise: a fixed value per sequence implementation, a max distortion per sequence implementation, a max distortion per frame implementation, a max distortion per patch implementation, a per boundary point implementation and a matched patch/vertex index implementation. The fixed value per sequence implementation includes limiting a scope of a search for a matching border point based on distance. The per boundary point implementation includes receiving distortion information without performing a search. The matched patch/vertex index implementation includes matching indices. Selecting the zippering implementation from the plurality of mesh zippering implementations is programmed. Selecting the zippering implementation from the plurality of mesh zippering implementations is adaptively selected based on a set of detected criteria.

In another aspect, a system comprises an encoder configured for encoding content and a decoder configured for:

finding a plurality of border points of the content, selecting a zippering implementation from a plurality of mesh zippering implementations and merging vertices based on the selected mesh zippering implementation. The plurality of mesh zippering implementations comprise: a fixed value per sequence implementation, a max distortion per sequence implementation, a max distortion per frame implementation, a max distortion per patch implementation, a per boundary point implementation and a matched patch/vertex index implementation. The fixed value per sequence implementation includes limiting a scope of a search for a matching border point based on distance. The per boundary point implementation includes receiving distortion information without performing a search. The matched patch/vertex index implementation includes matching indices. Selecting the zippering implementation from the plurality of mesh zippering implementations is programmed. Selecting the zippering implementation from the plurality of mesh zippering implementations is adaptively selected based on a set of detected criteria.

DETAILED DESCRIPTION OF THE PREFERRED EMBODIMENT

Ways to improve mesh reconstruction by modifying the position of vertices at the border of patches to make sure that neighboring patches do not have a gap between them, also known as zippering, are described herein. Six different methods to implement the post-processing operation, as well as syntax elements and semantics for transmission of the filter parameters, are disclosed. A hierarchical method indicate the geometry distortion that can generate gaps between patches. The value per frame, or per patch, or per boundary object is sent. The number of bits to encode the values is also dependent on the previous geometry distortion. A method sends index matches instead of geometry distortion. The matching index is sent per boundary vertex, but a method to send only one index of the pair is implemented as well.

As described in U.S. patent application Ser. No. 17/161,300, filed Jan. 28, 2021, titled, "PROJECTION-BASED MESH COMPRESSION" and U.S. Provisional Patent Application Ser. No. 62/991,128, filed Mar. 18, 2020 and titled, "PROJECTION-BASED MESH COMPRESSION," which are hereby incorporated by reference in their entireties for all purposes, zippering addresses the issue of misaligned vertices.

Figure 1:
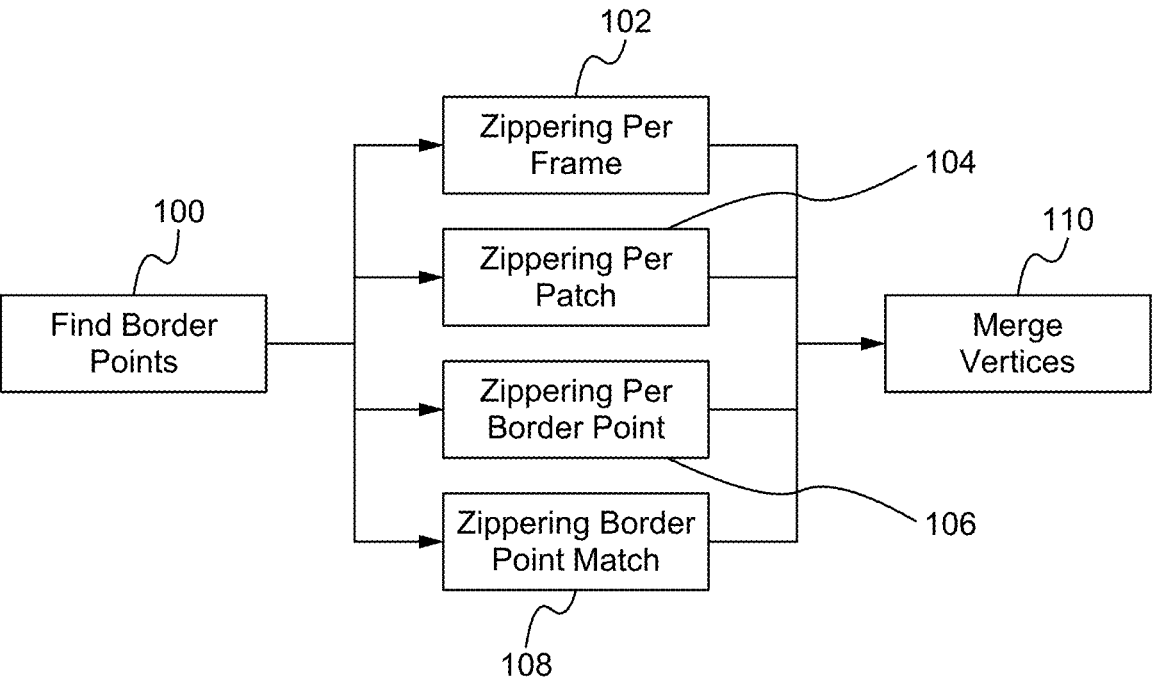
FIG. 1 illustrates a flowchart of a method of mesh zippering according to some embodiments.

FIG. 1 illustrates a flowchart of a method of mesh zippering according to some embodiments. In the step 100, border points are found. The border points are able to be found in any manner. After the border points are found, mesh zippering is implemented. Mesh zippering includes determining neighbors of the bordering vertices and merging specific neighboring bordering vertices. The mesh zippering is able to be implemented using one or more different implementations. Mesh zippering is utilized to find points/vertices that match to remove any gaps in a mesh. To find the matching points, a search is performed in the 3D space by searching neighboring points of a point. The search is able to be limited in scope (e.g., based on a fixed value such as a maximum distance of 5 or based on a maximum distortion). Therefore, if the distance is larger than 5, the point will never find its match. The search is also able to be limited based on a maximum distortion. The maximum distortion for each point may be different. Mesh zippering per sequence is able to use distance or maximum distortion to limit the search. Since searching based on the maximum distortion may be too time consuming or computationally expensive for an entire sequence, searching on a per frame basis may be better. For example, most frames are searched based on a fixed value (e.g., maximum distance), but one specific frame is searched based on the maximum distortion. The maximum distortion is able to be implemented on a per patch basis. For example, there are patches that are large, and the distortion may be smaller. In another example, there are patches that are small, and the distortion may be larger. The distortion is able to be sent on a per border/boundary point case. No search is performed with this implementation; rather, the distortion is applied as received. However, more distortion information is sent, so the bitrate is higher, but the mesh reconstruction is better (e.g., more accurate).

In the step 102, zippering per frame is implemented. As described, the zippering performs a search for each point in a frame using a maximum distortion. By performing zippering per frame instead of an entire sequence, some processing is performed without distortion information, and only frames that are more distorted use the zippering based on a maximum distortion. In the step 104, zippering per patch is implemented. By performing zippering per patch, some processing is performed without distortion information, and only patches that are more distorted use the zippering based on a maximum distortion. In the step 106, zippering per border point is implemented. No search is performed with zippering per border point; rather, the distortion is applied as received. However, more distortion information is sent, so the bitrate is higher, but the mesh reconstruction is better (e.g., more accurate). In the step 108, zippering border point match is implemented. Indices that are matched to each other are sent. The decoder will determine where the patches go in the 3D space based on the matching vertices (e.g., averaging a distance between two points or selecting one of the points). The zippering implementation is able to be selected in any manner such as being programmed in or adaptively selected based on a set of detected criteria (e.g., detecting that a frame or patch includes a distortion amount higher than a threshold).

In the step 110, vertices are merged. Merging the vertices is able to be performed in any manner. In some embodiments, fewer or additional steps are implemented. In some embodiments, the order of the steps is modified. The zippering implementations are performed on the decoder side.

Figures 2, 3:
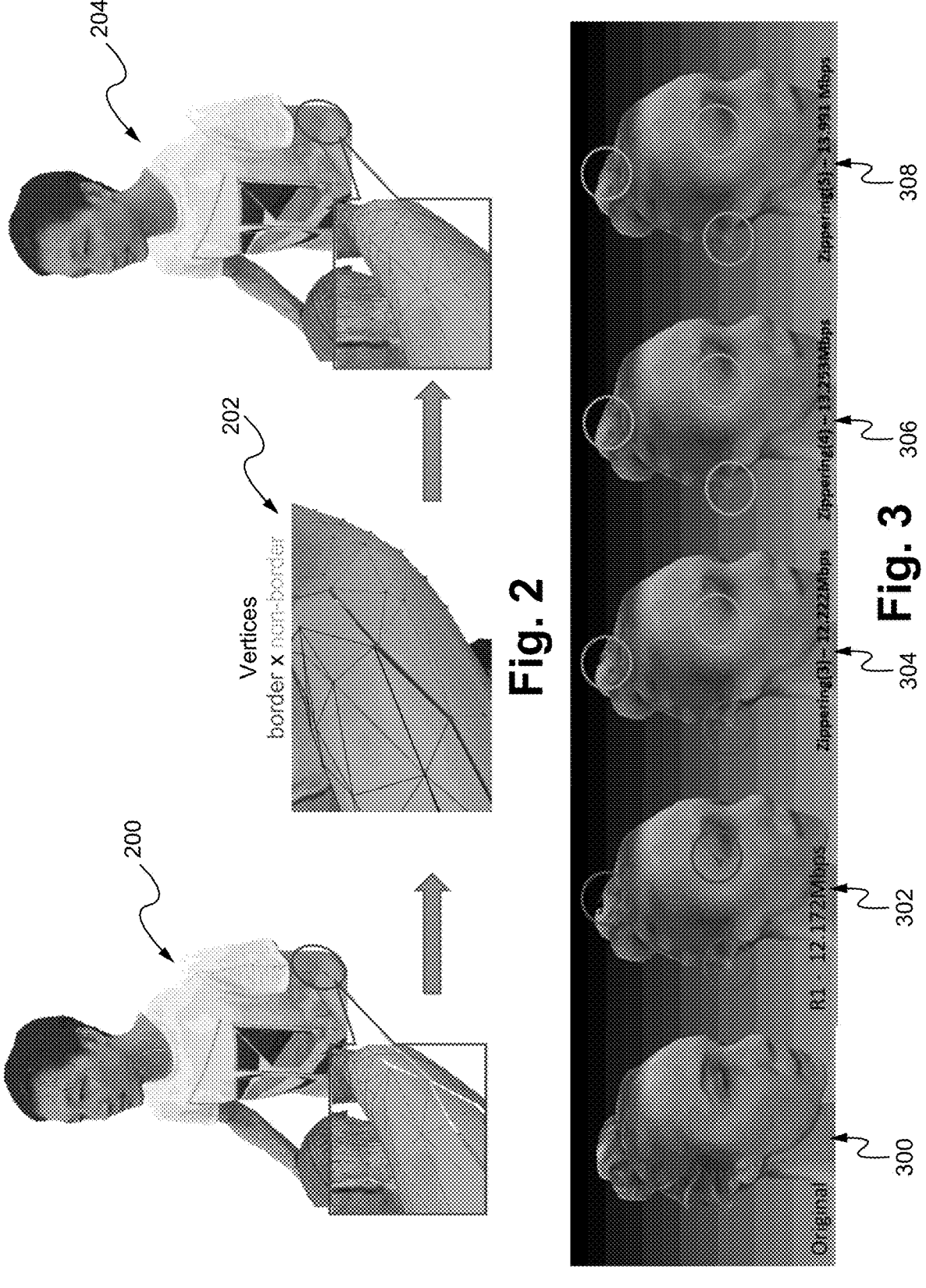
FIG. 2 illustrates images of aspects of zippering according to some embodiments.
FIG. 3 illustrates images showing advantages and disadvantages of each zippering implementation according to some embodiments.

FIG. 2 illustrates images of aspects of zippering according to some embodiments. An image 200 is able to have gaps between border points. In image 202, zippering is applied to border vertices to narrow or eliminate the gaps. As described, zippering involves: classifying vertices as bordering vertices or non-bordering vertices, determining neighbors of the bordering vertices and merging the neighboring bordering vertices. Image 204, shows a decoded image without gaps by utilizing zippering.

FIG. 3 illustrates images showing advantages and disadvantages of each zippering implementation according to some embodiments. Image 300 is the original image. Image 302 shows without zippering—12.172 Mbps. Image 304 shows zippering—12.222 Mbps. Image 306 shows zippering—13.253 Mbps. Image 308 shows zippering—13.991 Mbps. By zippering, gaps are able to be filled such as in the face, hair and ear.

The updated zippering syntax is described herein:

| | Descriptor |
|---|---|
| geometry_smoothing( payloadSize ) { | |
|   gs_persistence_flag | u(1) |
|   gs_reset_flag | u(1) |
|   gs_instances_updated | u(8) |
|   for( i = 0; i < gs_instances_updated; i++ ) { | |
|     gs_instance_index[ i ] | u(8) |
|     k = gs_instance_index[ i ] | |
|     gs_instance_cancel_flag[ k ] | u(1) |
|     if( gs_instance_cancel_flag[ k] != 1 ) { | |
|       gs_method_type[ k ] | ue(v) |
|       if( gs_method_type[ k ] == 1 ) { | |
|         gs_filter_eom_points_flag[ k ] | u(1) |
|         gs_grid_size_minus2[ k ] | u(5) |
|         gs_threshold[ k ] | u(8) |
|       } | |
|       if( gs_method_type[ k ] == 2 ) { | |
|       gs_zippering_max_match_distance[ k ] | ue(v) |
|       if( gs_zippering_max_match_distance_per_frame[ k ] != 0 ) { | |
|         gs_zippering_send_border_point_match[ k ] | u(1) |
|         if( gs_zippering_send_border_point_match[ k ] ) { | |
|           gs_zippering_number_of_patches[ k ] | ue(v) |
|           numPatches = gs_zippering_number_of_patches[ k ] | ue(v) |
|           for( p = 0; p < numPatches; p++ ) | |
|             gs_zippering_number_of_border_points[ k ][ p ] | ue(v) |
|           for( p = 0; p < numPatches; p++ ) { | |
|             numBorderPoints = gs_zippering_number_of_border_points[ k ][ p ] | |
|             for( b = 0; b < numBorderPoints ; b++ ) { | |
|               if( zipperingBorderPointMatchIndexFlag[ k ][ p ][ b ] == 0) { | |
|                 gs_zippering_border_point_match_patch_index[ k ][ p ][ b ] | u(v) |
|                 patchIndex = gs_zippering_border_point_match_patch_index[ k ][ p ][ b ] | |
|                 if( patchIndex != numPatches ) { | |
|                   gs_zippering_border point_match_border_point_index[ k ][ p ][ b] | u(v) |
|                   borderIndex=gs_zippering_border_point_match_border_point_index[ k ][ p ][ b ] | |
|                   if( patchIndex > p) | |
|                   zipperingBorderPointMatchIndexFlag[ k ][ patchIndex ][ borderIndex ] = 1 | |
|                 } | |
|               } | |
|             } | |
|           } | |
|         } else { | |
|           gs_zippering_send_distance_per_patch[ k ] | u(1) |
|           gs_zippering_send_distance_per_border_point[ k ] | u(1) |
|           if( gs_zippering_send_distance_per_patch[ k ] ) { | |
|             gs_zippering_number_of_patches[ k ] | ue(v) |
|             numPatches = gs_zippering_number_of_patches[ k ] | ue(v) |
|             for( p = 0; p < numPatches; p++ ) { | |
|               gs_zippering_max_match_distance_per_patch[ k ][ p ] | u(v) |
|               if( gs_zippering_max_match_distance_per_patch[ k ][ p ] != 0 ) { | |
|                 if( gs_zippering_send_distance_per_border_point[ k ][ p ] == 1 ) { | |
|                   gs_zippering_number_of_border_points[ k ][ p ] | ue(v) |
|                   numBorderPoints = gs_zippering_number_of_border_points[ k ][ p ] | |
|                   for( b = 0; b < numBorderPoints ; b++ ) | |
|                     gs_zippering_border_point_distance[ k ][ p ][ b ] | i(v) |
|                 } | |
|               } | |
|             } | |
|           } | |
|         } | |
|       } | |
|     } | |
|   } | |
| } | | gs_zippering_max_match_distance[k] specifies the value of the variable zipperingMaxMatchDistance[k] used for processing the current mesh frame for geometry smoothing instance with index k when the zippering filtering process is used.

gs_zippering_send_border_point_match[k] equal to 1 specifies that zippering by transmitting matching indices is applied to border points for the geometry smoothing instance with index k.

gs_zippering_send_border_point_match[k] equal to 0 specifies that zippering by transmitting matching indices is not applied to border points for the geometry smoothing instance with index k. The default value of gs_zippering_send_border_point_match[k] is equal to 0.

gs_zippering_number_of_patches[k] indicates the number of patches that are to be filtered by the current SEI message. The value of gs_zippering_number_of- _patches shall be in the range from 0 to MaxNumP-atches[frameIdx], inclusive. The default value of gs_zippering_number_of_patches is equal to 0 gs_zippering_number_of_border_points[k][p] indicates the number of border points numBorderPoints[p] of a patch with index p.

gs_zippering_border_point_match_patch_index[k][p][b] specifies the value of the variable zipperingBorder-PointMatchPatchIndex[k][p][b] used for processing the current border point with index b, in the current patch with index p, in the current mesh frame for geometry smoothing instance with index k when the zippering filtering process is used.

gs_zippering_border_point_match_border_point_index [k][p][b] specifies the value of the variable zippering-BorderPointMatchBorderPointIndex[k][p][b] used for processing the current border point with index b, in the current patch with index p, in the current mesh frame for geometry smoothing instance with index k when the zippering filtering process is used gs_zippering_send_distance_per_patch[k] equal to 1 specifies that zipper-ing by transmitting matching distance per patch is applied to border points for the geometry smoothing instance with index k. gs_zippering_send_distan-ce_per_patch[k] equal to 0 specifies that zippering by matching distance per patch is not applied to border points for the geometry smoothing instance with index k. The default value of gs_zippering_send_distan-ce_per_patch[k] is equal to 0.

gs_zippering_send_distance_per_border_point[k] equal to 1 specifies that zippering by transmitting matching distance per border point is applied to border points for the geometry smoothing instance with index k. gs_zip-pering_send_distance_per_border_point [k] equal to 0 specifies that zippering by matching distance per border point is not applied to border points for the geometry smoothing instance with index k. The default value of gs_zippering_send_distance_per_border_point [k] is equal to 0.

gs_zippering_max_match_distance_per_patch[k] speci-fies the value of the variable zipperingMaxMatchDis-tancePerPatch[k][p] used for processing the current patch with index p in the current mesh frame for geometry smoothing instance with index k when the zippering filtering process is used.

gs_zippering_border_point_distance[k][p][b] specifies the value of the variable zipperingMaxMatchDistan-cePerBorderPoint[k][p][b] used for processing the cur-rent border point with index b, in the current patch with index p, in the current mesh frame for geometry smoothing instance with index k when the zippering filtering process is used.

As described, trade-off is able to be achieved by choosing different zippering methods. Sending a single distance for the entire sequence uses just one single SEI message, while sending the distance per frame, patch or border distance includes sending SEI messages every frame. However, the subjective impact may be significant, since holes may or may not be visible, depending on the zippering method chosen.

Figure 4:
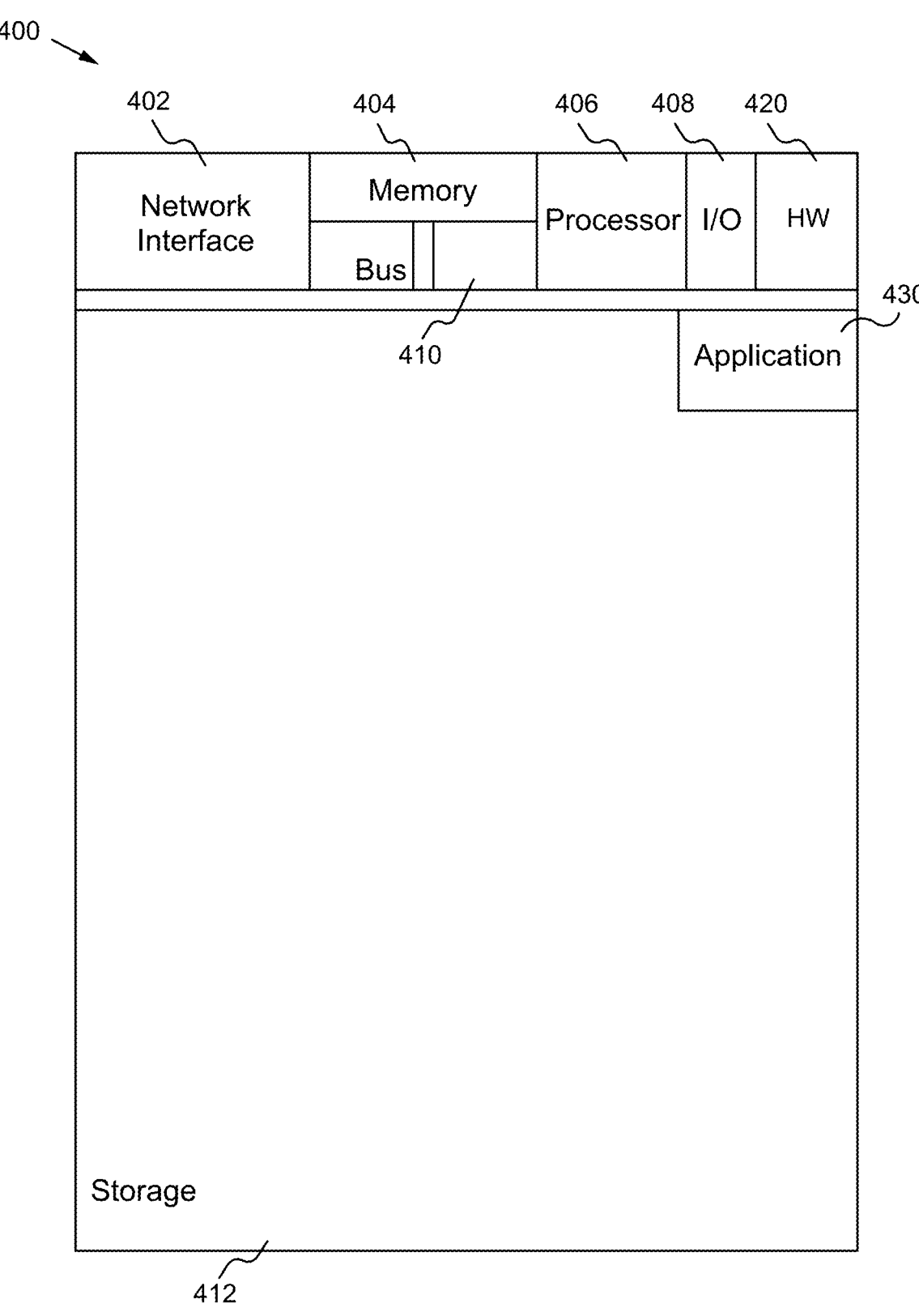
FIG. 4 illustrates a block diagram of an exemplary computing device configured to implement the mesh zippering method according to some embodiments.

FIG. 4 illustrates a block diagram of an exemplary com-puting device configured to implement the mesh zippering method according to some embodiments. The computing device 400 is able to be used to acquire, store, compute, process, communicate and/or display information such as images and videos including 3D content. The computing device 400 is able to implement any of the encoding/ decoding aspects. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Mesh zippering application(s) 430 used to implement the mesh zippering implementation are likely to be stored in the storage device 412 and memory 404 and processed as applications are typically processed. More or fewer components shown in FIG. 4 are able to be included in the computing device 400. In some embodi-ments, mesh zippering hardware 420 is included. Although the computing device 400 in FIG. 4 includes applications 430 and hardware 420 for the mesh zippering implementa-tion, the mesh zippering method is able to be implemented on a computing device in hardware, firmware, software or any combination thereof. For example, in some embodi-ments, the mesh zippering applications 430 are programmed in a memory and executed using a processor. In another example, in some embodiments, the mesh zippering hard-ware 420 is programmed hardware logic including gates specifically designed to implement the mesh zippering method.

In some embodiments, the mesh zippering application(s) 430 include several applications and/or modules. In some embodiments, modules include one or more sub-modules as well. In some embodiments, fewer or additional modules are able to be included.

Examples of suitable computing devices include a per-sonal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high defi-nition disc writer/player, ultra high definition disc writer/player), a television, a home entertainment system, an aug-mented reality device, a virtual reality device, smart jewelry (e.g., smart watch), a vehicle (e.g., a self-driving vehicle) or any other suitable computing device.

To utilize the mesh zippering method, a device acquires or receives 3D content (e.g., point cloud content). The mesh zippering method is able to be implemented with user assistance or automatically without user involvement.

In operation, the mesh zippering method enables more efficient and more accurate 3D content decoding compared to previous implementations.

Some Embodiments of Mesh Zippering

1. A method programmed in a non-transitory memory of a device comprising:
   finding a plurality of border points; selecting a zipper-ing implementation from a plurality of mesh zipper-ing implementations;
   and merging vertices based on the selected mesh zip-pering implementation.

2. The method of clause 1 wherein the plurality of mesh zippering implementations comprise:
a fixed value per sequence implementation;
a max distortion per sequence implementation;
a max distortion per frame implementation;
a max distortion per patch implementation;
a per boundary point implementation; and
a matched patch/vertex index implementation.
3. The method of clause 2 wherein the fixed value per sequence implementation includes limiting a scope of a search for a matching border point based on distance.
4. The method of clause 2 wherein the per boundary point implementation includes receiving distortion information without performing a search.
5. The method of clause 2 wherein the matched patch/vertex index implementation includes matching indices.
6. The method of clause 1 wherein selecting the zippering implementation from the plurality of mesh zippering implementations is programmed.
7. The method of clause 1 wherein selecting the zippering implementation from the plurality of mesh zippering implementations is adaptively selected based on a set of detected criteria.
8. An apparatus comprising:
a non-transitory memory for storing an application, the application for:
finding a plurality of border points;
selecting a zippering implementation from a plurality of mesh zippering implementations; and
merging vertices based on the selected mesh zippering implementation; and
a processor coupled to the memory, the processor configured for processing the application.
9. The apparatus of clause 8 wherein the plurality of mesh zippering implementations comprise:
a fixed value per sequence implementation;
a max distortion per sequence implementation;
a max distortion per frame implementation;
a max distortion per patch implementation;
a per boundary point implementation; and
a matched patch/vertex index implementation.
10. The apparatus of clause 9 wherein the fixed value per sequence implementation includes limiting a scope of a search for a matching border point based on distance.
11. The apparatus of clause 9 wherein the per boundary point implementation includes receiving distortion information without performing a search.
12. The apparatus of clause 9 wherein the matched patch/vertex index implementation includes matching indices.
13. The apparatus of clause 8 wherein selecting the zippering implementation from the plurality of mesh zippering implementations is programmed.
14. The apparatus of clause 8 wherein selecting the zippering implementation from the plurality of mesh zippering implementations is adaptively selected based on a set of detected criteria.
15. A system comprising:
an encoder configured for encoding content; and
a decoder configured for:
finding a plurality of border points of the content;
selecting a zippering implementation from a plurality of mesh zippering implementations; and
merging vertices based on the selected mesh zippering implementation.

16. The system of clause 15 wherein the plurality of mesh zippering implementations comprise:
a fixed value per sequence implementation;
a max distortion per sequence implementation;
a max distortion per frame implementation;
a max distortion per patch implementation;
a per boundary point implementation; and
a matched patch/vertex index implementation.
17. The system of clause 16 wherein the fixed value per sequence implementation includes limiting a scope of a search for a matching border point based on distance.
18. The system of clause 16 wherein the per boundary point implementation includes receiving distortion information without performing a search.
19. The system of clause 16 wherein the matched patch/vertex index implementation includes matching indices.
20. The system of clause 15 wherein selecting the zippering implementation from the plurality of mesh zippering implementations is programmed.
21. The system of clause 15 wherein selecting the zippering implementation from the plurality of mesh zippering implementations is adaptively selected based on a set of detected criteria.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
finding a plurality of border points;
selecting a zippering implementation from a plurality of mesh zippering implementations, wherein the plurality of mesh zippering implementations include a fixed value per sequence implementation which limits a scope of a search for a matching border point based on distance such that only points with a distance less than the fixed value are searched for the matching border point, wherein the distance of a point is compared with the fixed value and when the distance of the point is greater than the fixed value, the point is excluded from the search, wherein the plurality of mesh zippering implementations include a per boundary point implementation which receives distortion information from an encoder without performing the search; and
merging vertices based on the selected mesh zippering implementation.
2. The method of claim 1 wherein the plurality of mesh zippering implementations include a matched patch/vertex index implementation which matches indices together.
3. The method of claim 1 wherein selecting the zippering implementation from the plurality of mesh zippering implementations is adaptively selected based on a set of detected criteria.
4. An apparatus comprising:
a non-transitory memory for storing an application, the application for:
finding a plurality of border points;
selecting a zippering implementation from a plurality of mesh zippering implementations, wherein the plurality of mesh zippering implementations include a fixed value per sequence implementation which limits a scope of a search for a matching border point based on distance such that only points with a distance less than the fixed value are searched for the matching border point, wherein the distance of a point is compared with the fixed value and when the distance of the point is greater than the fixed value, the point is excluded from the search, wherein the plurality of mesh zippering implementations include a per boundary point implementation which receives distortion information from an encoder without performing the search; and merging vertices based on the selected mesh zippering implementation; and a processor coupled to the memory, the processor configured for processing the application.

5. The apparatus of claim 4 wherein the plurality of mesh zippering implementations include a matched patch/vertex index implementation which matches indices together.

6. The apparatus of claim 4 wherein selecting the zippering implementation from the plurality of mesh zippering implementations is adaptively selected based on a set of detected criteria.

7. A system comprising:

an encoder configured for encoding content; and a decoder configured for:

finding a plurality of border points of the content;

selecting a zippering implementation from a plurality of mesh zippering implementations, wherein the plurality of mesh zippering implementations include a fixed value per sequence implementation which limits a scope of a search for a matching border point based on distance such that only points with a distance less than the fixed value are searched for the matching border point, wherein the distance of a point is compared with the fixed value and when the distance of the point is greater than the fixed value, the point is excluded from the search, wherein the plurality of mesh zippering implementations include a per boundary point implementation which receives distortion information from an encoder without performing the search; and merging vertices based on the selected mesh zippering implementation.

8. The system of claim 7 wherein the plurality of mesh zippering implementations include a matched patch/vertex index implementation includes matching which matches indices together.

9. The system of claim 7 wherein selecting the zippering implementation from the plurality of mesh zippering implementations is adaptively selected based on a set of detected criteria.

10. A method programmed in a non-transitory memory of a device comprising:

finding a plurality of border points;

selecting a zippering implementation from a plurality of mesh zippering implementations, wherein the plurality of mesh zippering implementations include a fixed value per sequence implementation which limits a scope of a search for a matching border point based on distance such that only points with a distance less than the fixed value are searched for the matching border point, wherein the distance of a point is compared with the fixed value and when the distance of the point is greater than the fixed value, the point is excluded from the search, wherein the plurality of mesh zippering implementations include a matched patch/vertex index implementation which matches indices together; and merging vertices based on the selected mesh zippering implementation.

11. The method of claim 10 wherein selecting the zippering implementation from the plurality of mesh zippering implementations is adaptively selected based on a set of detected criteria.

12. An apparatus comprising:

a non-transitory memory for storing an application, the application for:

finding a plurality of border points;

selecting a zippering implementation from a plurality of mesh zippering implementations, wherein the plurality of mesh zippering implementations include a fixed value per sequence implementation which limits a scope of a search for a matching border point based on distance such that only points with a distance less than the fixed value are searched for the matching border point, wherein the distance of a point is compared with the fixed value and when the distance of the point is greater than the fixed value, the point is excluded from the search, wherein the plurality of mesh zippering implementations include a matched patch/vertex index implementation which matches indices together; and merging vertices based on the selected mesh zippering implementation; and a processor coupled to the memory, the processor configured for processing the application.

13. The apparatus of claim 12 wherein selecting the zippering implementation from the plurality of mesh zippering implementations is adaptively selected based on a set of detected criteria.

14. A system comprising:

an encoder configured for encoding content; and a decoder configured for:

finding a plurality of border points of the content;

selecting a zippering implementation from a plurality of mesh zippering implementations, wherein the plurality of mesh zippering implementations include a fixed value per sequence implementation which limits a scope of a search for a matching border point based on distance such that only points with a distance less than the fixed value are searched for the matching border point, wherein the distance of a point is compared with the fixed value and when the distance of the point is greater than the fixed value, the point is excluded from the search, wherein the plurality of mesh zippering implementations include a matched patch/vertex index implementation includes matching which matches indices together; and merging vertices based on the selected mesh zippering implementation.

15. The system of claim 14 wherein selecting the zippering implementation from the plurality of mesh zippering implementations is adaptively selected based on a set of detected criteria.

* * * * *